US011529688B2

(12) United States Patent
Schaeperkoetter et al.

(10) Patent No.: US 11,529,688 B2
(45) Date of Patent: Dec. 20, 2022

(54) HYDRAULIC-EXPANSION CHUCK AND THE USE THEREOF

(71) Applicant: Schaeffler Technologies AG & Co. KG, Herzogenaurach (DE)

(72) Inventors: Claus Schaeperkoetter, Erlangen (DE); Stefan Becke, Neustadt (DE); Michael Mayer, Weisendorf (DE)

(73) Assignee: Shaeffler Technologies AG & Co. KG, Herzogenaurach (DE)

( * ) Notice: Subject to any disclaimer, the term of this patent is extended or adjusted under 35 U.S.C. 154(b) by 29 days.

(21) Appl. No.: 17/044,990

(22) PCT Filed: Feb. 28, 2019

(86) PCT No.: PCT/DE2019/100182
§ 371 (c)(1),
(2) Date: Oct. 2, 2020

(87) PCT Pub. No.: WO2019/196973
PCT Pub. Date: Oct. 17, 2019

(65) Prior Publication Data
US 2021/0252609 A1 Aug. 19, 2021

(30) Foreign Application Priority Data
Apr. 9, 2018 (DE) ...................... 10 2018 108 306.8

(51) Int. Cl.
| B23B 31/30 | (2006.01) |
| B23B 31/117 | (2006.01) |
| B33Y 80/00 | (2015.01) |

(52) U.S. Cl.
CPC ........ B23B 31/305 (2013.01); B23B 31/1178 (2013.01); *B33Y 80/00* (2014.12)

(58) Field of Classification Search
CPC . B23B 31/305; B23B 31/1178; B23B 31/302; B23B 31/1172; B33Y 80/00; Y10T 279/1216; Y10T 279/1241
See application file for complete search history.

(56) References Cited

U.S. PATENT DOCUMENTS

| 2,753,388 A * | 7/1956 | Bjerkas | ................ H05B 7/105 |
| | | | 279/4.06 |
| 2,758,145 A * | 8/1956 | Bjerkas | ................ H05B 7/105 |
| | | | 269/21 |

(Continued)

FOREIGN PATENT DOCUMENTS

| CN | 101450388 A | 6/2009 |
| CN | 105121078 A | 12/2015 |

(Continued)

OTHER PUBLICATIONS

Machine Translation, Description DE3248148A1. (Year: 1984).*

(Continued)

*Primary Examiner* — Chwen-Wei Su

(57) ABSTRACT

A hydraulic-expansion chuck for clamping a workpiece includes an annular body, an inner circumferential surface, an outer circumferential surface, and an axis of rotation. The chuck also includes a channel integrated into the annular body for receiving a pressurized hydraulic fluid to clamp the workpiece. The channel has an annular peripheral channel section formed radially between the inner circumferential surface and the outer circumferential surface. The chuck also includes a holding contour with a plurality of expansion lugs disposed on the inner circumferential surface and a plurality of further channel sections branching off from the channel. At least one of the plurality of further channel sections extends into a respective lug of the plurality of expansion lugs, and the hydraulic-expansion chuck is manufactured by an additive manufacturing process.

9 Claims, 3 Drawing Sheets

(56) References Cited

U.S. PATENT DOCUMENTS

| | | | | |
|---|---|---|---|---|
| 3,250,542 | A * | 5/1966 | Winnen | B23B 31/305 |
| | | | | 279/2.08 |
| 3,463,499 | A * | 8/1969 | Mott | B23B 31/1177 |
| | | | | 294/93 |
| 3,592,482 | A * | 7/1971 | Better | B23B 31/305 |
| | | | | 279/4.06 |
| 5,904,451 | A | 5/1999 | Gerber | |
| 7,217,072 | B1 | 5/2007 | Haimer | |
| 9,079,254 | B2 * | 7/2015 | Schuffenhauer | B23B 31/305 |
| 2019/0001420 | A1 * | 1/2019 | Teusch | B23B 31/305 |
| 2019/0040481 | A1 * | 2/2019 | Goldsmith | C21D 6/005 |

FOREIGN PATENT DOCUMENTS

| | | | |
|---|---|---|---|
| CN | 105312604 A | | 2/2016 |
| DE | 2926293 A1 | | 1/1981 |
| DE | 3248148 A1 | * | 4/1984 |
| DE | 4317170 A1 | | 11/1994 |
| DE | 19737215 A1 | | 3/1999 |
| DE | 102013100476 A1 | | 7/2014 |
| DE | 102015118757 B3 | | 1/2017 |
| DE | 102016116164 A1 | | 3/2018 |
| DE | 102017120077 A1 | | 3/2018 |
| JP | S5691923 A | | 7/1981 |
| JP | S57140925 U | | 9/1982 |
| JP | S57140926 U | | 9/1982 |
| JP | S5919204 U | | 2/1984 |
| JP | S63251106 A | | 10/1988 |
| KR | 20130007942 A | | 1/2013 |
| WO | 2007110213 A1 | | 10/2007 |
| WO | 2015166062 A1 | | 11/2015 |

OTHER PUBLICATIONS

Machine Translation, Description DE102013100476A1. [ (Year: 2014).*
Additive fabrication Rapid technologies, Verein Deutscher Ingenieure, Dec. 2009 VDI 3404.

* cited by examiner

HYDRAULIC-EXPANSION CHUCK AND THE USE THEREOF

CROSS-REFERENCE TO RELATED APPLICATIONS

This application is the United States National Phase of PCT Appln. No. PCT/DE2019/100182 filed Feb. 28, 2019, which claims priority to German Application No. DE102018108306.8 filed Apr. 9, 2018, the entire disclosures of which are incorporated by reference herein.

TECHNICAL FIELD

The disclosure relates to a hydraulic-expansion chuck for clamping a workpiece. The disclosure further relates to the use of such a hydraulic clamping tool. The field of application of the disclosure extends primarily to clamping tools for machining of prototypes to series components.

BACKGROUND

Precise clamping tools are required for clamping workpieces, for example for machining operations. The more precise and reproducible the clamping tool can hold a workpiece, the more effective and efficient is the machining of the workpiece. The achievable accuracies on the finished part essentially result from the clamping accuracy of the clamping tool, e.g., from the position between the workpiece and the clamping tool. Furthermore, the clamping process of the workpiece has an impact on the cycle time or set-up and clamping efforts of the machine operator. There is potential for automation in machining series production.

Hydraulic clamping tools are known from the prior art. As a rule, hydraulic expansion clamping tools are complex soldering and/or welding constructions, these merely having simple, rotationally symmetrical holding or clamping contours. The adaptation of a hydraulic clamping tool, e.g., a hydraulic mandrel, to the workpiece to be clamped is possible only to a limited extent, for example by means of clamping rings which can increase the clamping diameter.

DE 197 37 215 A1 discloses a tool combination which essentially consists of a clamping tool for lenses and a dressing tool for polishing tools, both of which, when combined to form a unit, are fastened to a single workpiece spindle. The dressing tool and the support ring can be firmly connected to one another. The tool combination also includes a hydraulic chuck.

DE 10 2016 116 164 A1 describes a tool component for a machined turning operation, e.g., a clamping tool holder. At least one hollow chamber is produced in the tool component by an additive sintering manufacturing process, which contains unsintered sinter powder. This is intended to produce a damping effect during the operation of the tool component. When the tool component is designed for use in a chuck, at least one expansion chamber can be formed in a shank section of the tool component to form an expansion chuck. Each expansion chamber is arranged as an annular chamber concentric with an axis of rotation of the tool holder, with a plurality of expansion chambers being arranged along the axis of rotation. The tool component can be designed as a hydraulic chuck.

SUMMARY

The disclosure describes a hydraulic-expansion chuck, whereby, on the one hand, a manufacturing time of the hydraulic-expansion chuck is to be shortened and, on the other hand, the hydraulic-expansion chuck is to be close to the contour of the workpiece. Furthermore, a use of the hydraulic clamping tool is to be specified.

The disclosed hydraulic-expansion chuck for clamping a workpiece includes at least one channel integrated therein for receiving a hydraulic fluid. The hydraulic fluid is to be pressurized in order to clamp the workpiece in the hydraulic-expansion chuck, and the hydraulic-expansion chuck is manufactured by an additive manufacturing process and is substantially annular. The at least one channel has at least one annular peripheral channel section formed radially between an inner circumferential surface and an outer circumferential surface of the hydraulic expansion tool. The hydraulic expansion tool also includes a retaining contour on the inner circumferential surface with a plurality of expansion lugs, and a plurality of further channel sections branching off from the at least one channel, with at least one further channel section extending into a respective one of the expansion lugs.

An "additive manufacturing process" means manufacturing processes in which the material is added in layers to create a workpiece. This contrasts with classic subtractive manufacturing processes, such as milling, drilling and turning, in which material is removed to produce the workpiece. A precise description of the various processes and procedures, which are summarized under the term "additive manufacturing processes", can be found in the guideline VDI 3404 (December 2009), to which reference is made here. With the help of additive manufacturing processes—also called generative manufacturing processes or 3D printing—both plastics and metals can be manufactured to the exact shape of the workpiece. The additive manufacturing of the hydraulic clamping tool enables a minimization of the production time as well as the realization of geometrically complex structures and geometries for the hydraulic clamping tool, e.g., of production contours that are oriented close to the shape of a workpiece to be clamped.

The holding contour provided according to the disclosure, including a plurality of expansion lugs, which is provided on the inner circumferential surface of the hydraulic clamping tool, enables workpieces which have a structured lateral surface to be clamped in the region of this lateral surface. The arrangement and configuration of the expansion lugs can be adapted directly to the workpiece to be clamped, e.g., a surface structure with visible elevations and/or indentations.

Thus, use of the hydraulic clamping tool according to the disclosure for clamping a workpiece in the form of a gear or in the form of a component with an external thread has proven successful. The structured outer surface is formed by the teeth of the gear or by the thread of the component. However, components which are non-circular, polygonal (having a circumference) or the like in the area of their lateral surface to be clamped can be clamped in by means of the hydraulic clamping tool according to the disclosure.

The hydraulic fluid that can be introduced into the at least one channel is an incompressible fluid and is used to transmit energy, e.g., to build up pressure. The hydraulic fluid may be an oil.

The hydraulic-expansion chuck may be made of spring steel. The spring steel is well suited to allow the hydraulic clamping tool to be elastically deformed when clamping and unclamping the workpiece. According to an example embodiment, the hydraulic-expansion chuck is made of a martensitic tool steel, e.g., the material X3NiCoMoTi 18 9 5 (1.2709). This material is high-strength and has a high tensile strength and a high yield strength with good toughness during cold and hot working. The working hardness is approx. 55 to 57 HRC.

The hydraulic-expansion chuck is essentially annular, the at least one channel having at least one circumferential channel section which is formed radially between an inner and outer peripheral surface of the hydraulic-expansion chuck. The "circumferential channel section" is to be understood to mean that the at least one channel is at least partially circular or elliptical in the interior of the hydraulic clamping tool. Thus, the at least one channel is located completely spatially within the outer skin of the hydraulic clamping tool and extends between two end faces and the inner and outer peripheral surfaces.

The hydraulic-expansion chuck has a holding contour on the inner circumferential surface. The holding contour may be at least partially adapted to the workpiece to be clamped. The holding contour serves to hold and clamp the workpiece and is designed in such a way that the workpiece can be clamped reproducibly and precisely. In an example embodiment, the holding contour is essentially designed to correspond to the workpiece in order to hold the workpiece essentially in a positive and non-positive manner.

The at least one channel has a plurality of, e.g., essentially axially formed, further channel sections, which at least partially extend in the direction of the holding contour into the expansion lugs. These, e.g., axially formed, further channel sections are fluidly connected to the at least one circumferential channel section and thus together form the at least one channel. Additional channel sections can be formed between each further channel section and the at least one circumferential channel section. The term "essentially axially formed channel sections" is to be understood to mean that these channel sections extend at least partially over an axial length of the hydraulic clamping tool. The essentially axially formed channel sections may be parallel to a longitudinal axis of the hydraulic clamping tool and e.g., perpendicular to the at least one circumferential channel section.

According to the disclosure, the holding contour includes a plurality of expansion lugs which are provided to expand radially inwards as well as in both circumferential directions when clamping the workpiece in order to clamp the workpiece. The expansion lugs may be in the form of teeth with rounded tooth heads, e.g., semi-cylindrical, and may extend in the axial direction. An expansion lug and a cavity may be arranged alternately in the circumferential direction on the inner circumferential surface of the hydraulic expansion clamping tool, with a workpiece to be clamped penetrating at least partially into the cavities and being clamped by the expansion lugs.

When viewed in the direction of an axis of rotation of the hydraulic clamping tool, the holding contour has, for example, an approximately undulating or sinusoidal profile. This enables effective clamping of workpieces on all sides, for example in the form of gear wheels. Alternatively, there may also be holding contours in which the expansion lugs are balloon-shaped, T-shaped or L-shaped.

The hydraulic-expansion chuck may have two end faces, each expansion lug extending between the two end faces with a constant lug height. The lug height of an expansion lug can also vary. The course of the lug height can also be designed in a wave-like manner, with a further channel section in the area of each wave maximum being able to extend into the expansion lug.

Each channel section may be approximately T-shaped in the direction of an axis of rotation of the hydraulic clamping tool. In an example embodiment, each channel section is T-shaped in the sectional view in a longitudinal direction of the circumferential channel section. These embodiments allow a high expansion in a region of the expansion lug which adjoins a workpiece during its expansion.

When the hydraulic clamping tool is used, the channel and the channel sections are filled with a hydraulic fluid, a hydraulic cylinder being fluidly connected to the at least one channel and intended to introduce pressure to the hydraulic fluid. In one embodiment, the hydraulic cylinder has, at least in part, a thread on an outer circumferential surface, which engages in a thread of the hydraulic clamping tool. The hydraulic cylinder is axially displaced by rotation of the hydraulic cylinder and a pressure is thus applied to the hydraulic fluid. As a result of this pressure, the holding contour is at least partially elastically deformed and the workpiece is thus clamped.

A ventilation cylinder may be fluidly connected to the at least one channel and provided to vent the at least one channel. Venting the at least one channel prevents unnecessary downtimes due to maintenance or changing hydraulic fluid.

According to an example embodiment, a plurality of receiving elements are arranged at least partially movably on the holding contour and are intended to be at least partially displaced against the workpiece when the workpiece is clamped.

BRIEF DESCRIPTION OF THE DRAWINGS

The below description of three exemplary embodiments of the disclosure is made with reference to the figures. In the figures, FIG. 3b shows a perspective, partially transparent sectional view of the hydraulic clamping tool according to FIG. 3a.

DETAILED DESCRIPTION

Figure 1A:
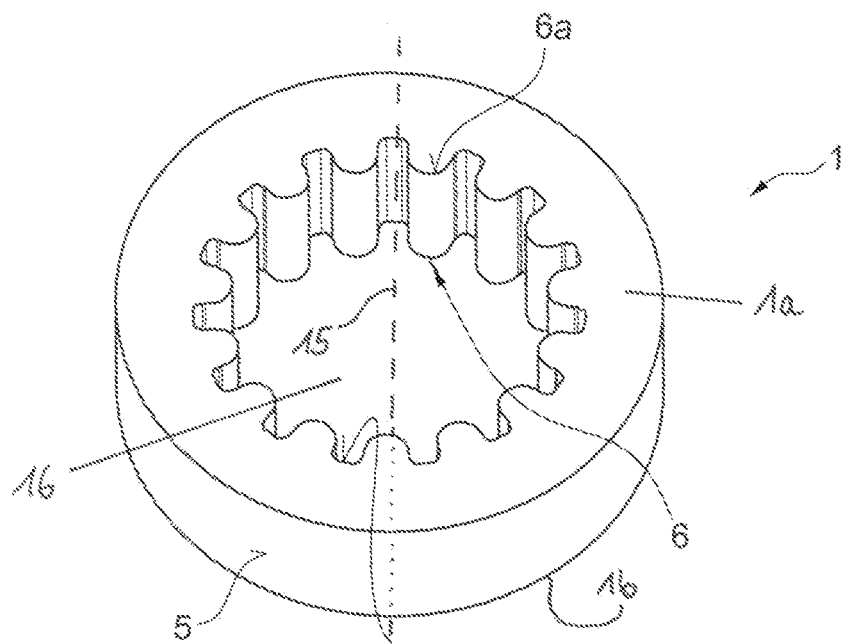
FIG. 1a shows a perspective view to illustrate the structure of a hydraulic clamping tool according to the disclosure, according to a first embodiment.
Figure 1B:
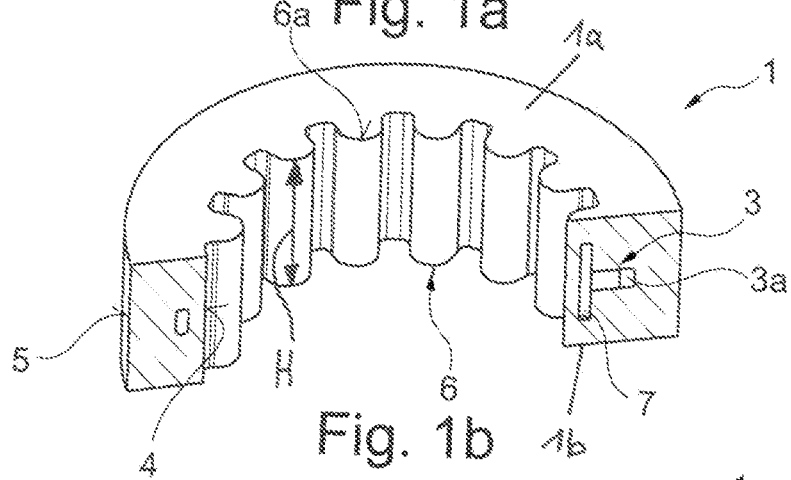
FIG. 1b shows a perspective sectional view of the hydraulic clamping tool according to FIG. 1a, FIG. 1c shows a further perspective sectional view of the hydraulic clamping tool according to FIG. 1a, FIG. 2a shows a perspective, partially transparent view to illustrate the structure of a hydraulic clamping tool according to the disclosure, according to a second embodiment.
Figure 1C:
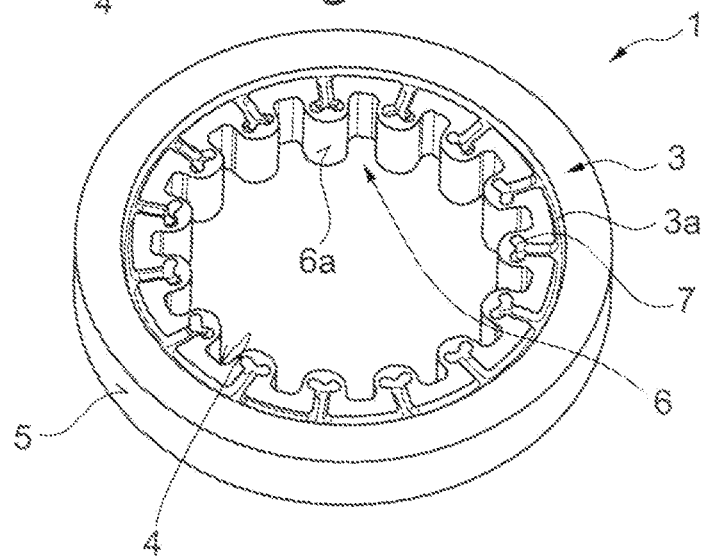
Figure 2A:
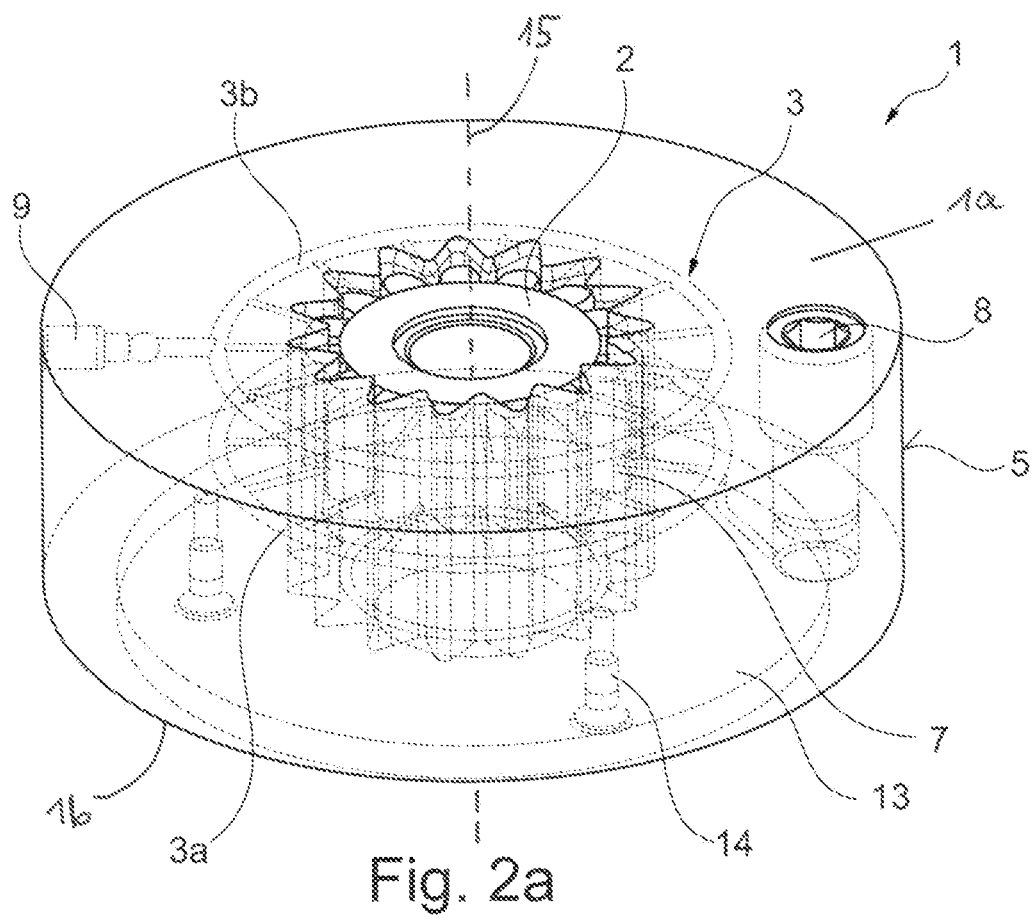
FIG. 2b shows a perspective, partially transparent sectional view of the hydraulic clamping tool according to FIG. 2a, FIG. 3a shows a perspective, partially transparent view to illustrate the structure of a hydraulic clamping tool according to the disclosure, according to a third embodiment.
Figure 2B:
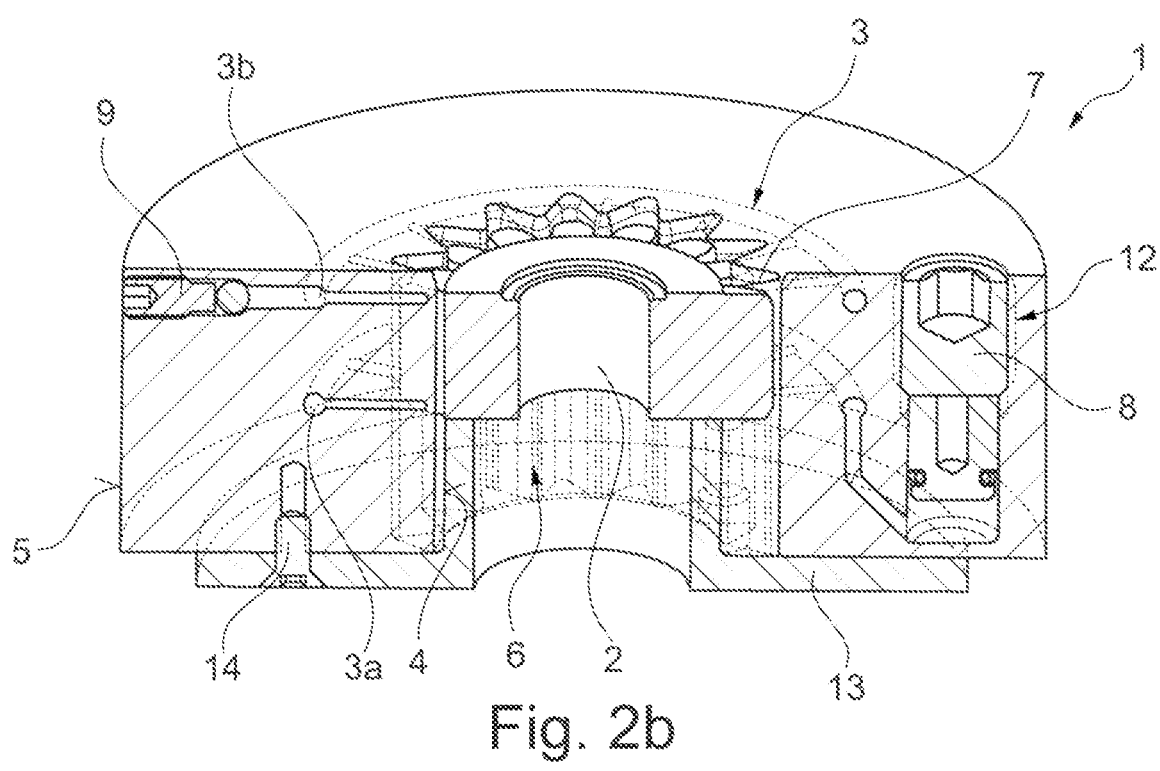
Figure 3A:
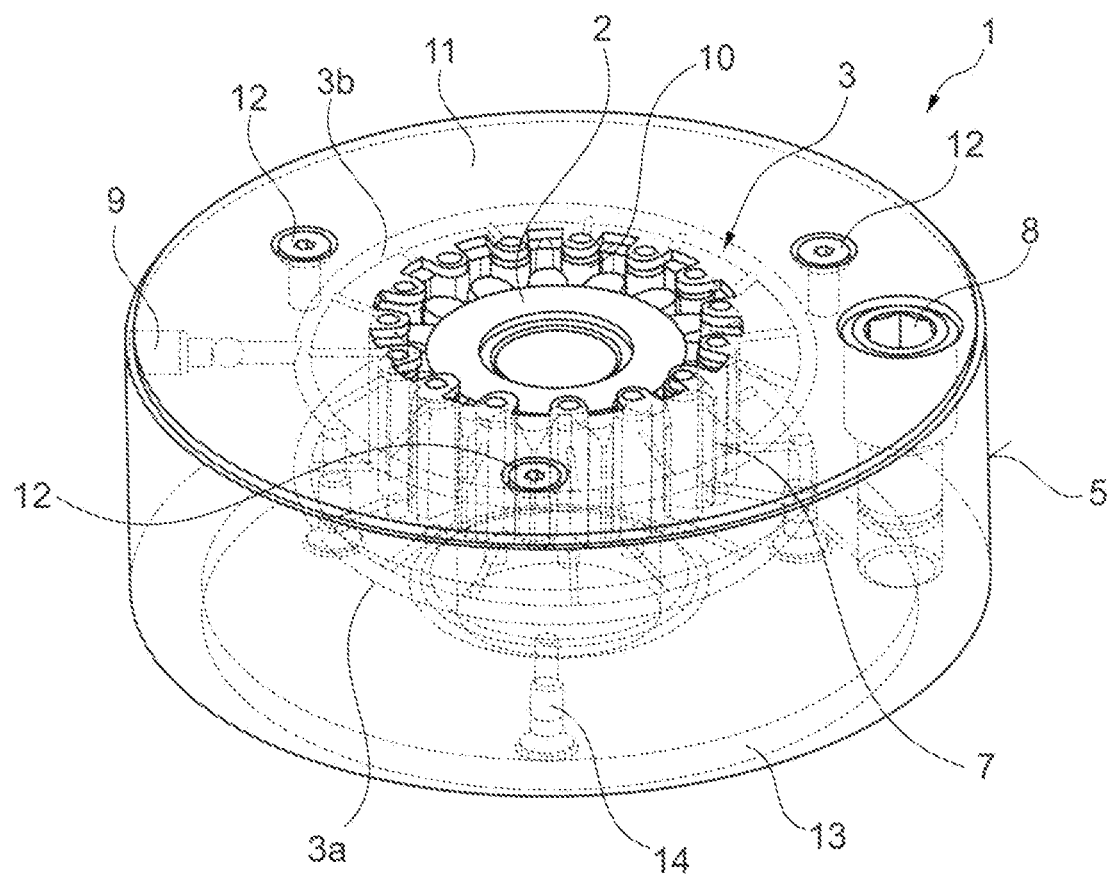
Figure 3B:
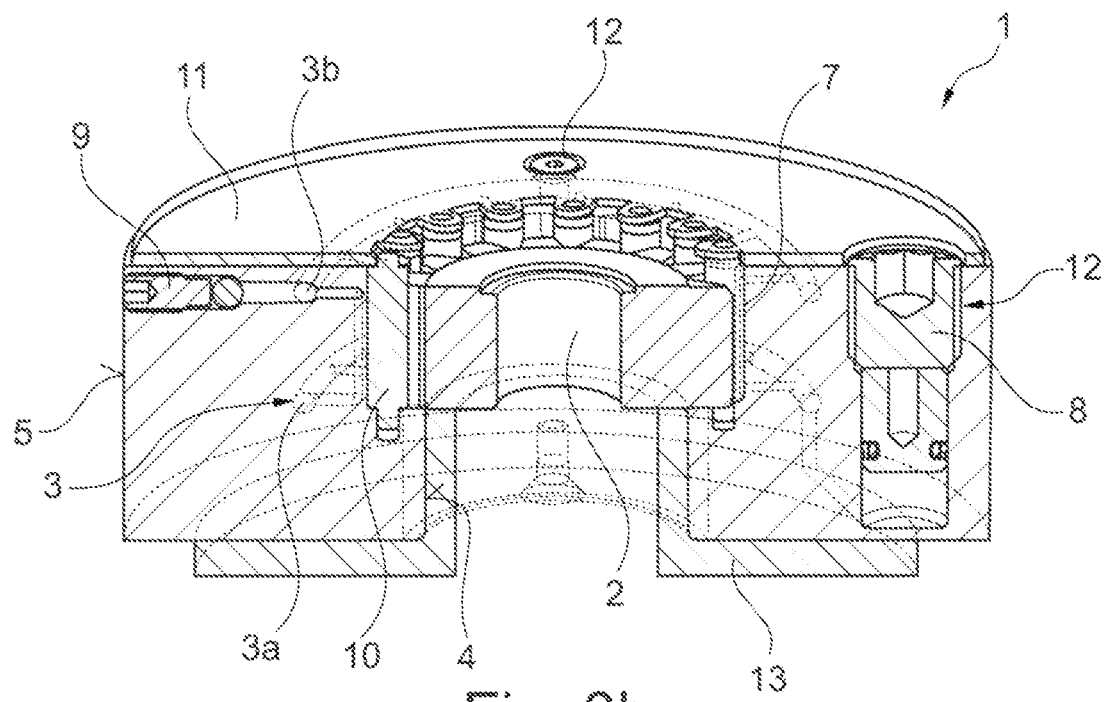

FIGS. 1a, 1b and 1c show a first embodiment of the hydraulic clamping tool 1 according to the disclosure. FIGS. 2a and 2b show a second embodiment of the hydraulic clamping tool 1 according to the disclosure. FIGS. 3a and 3b also show a third embodiment of the hydraulic clamping tool 1 according to the disclosure.

According to FIGS. 1a, 1b and 1c, the hydraulic expansion clamping tool 1 has a channel 3 integrated therein with a hydraulic fluid (not shown here) for clamping a workpiece (not shown in these figures). The hydraulic fluid is intended to be pressurized in order to clamp the workpiece in a workpiece receiving opening 16 in the hydraulic-expansion chuck 1. The hydraulic-expansion chuck has a rotation axis 15 about which it is rotated. Furthermore, the hydraulic-expansion chuck 1 has two end faces 1a, 1b, an inner peripheral surface 4 and an outer peripheral surface 5. The hydraulic-expansion chuck 1 is manufactured by an additive manufacturing process. In the present case, the hydraulic-expansion chuck 1 is made of a maraging tool steel. Furthermore, the hydraulic-expansion chuck 1 is essentially annular. A holding contour 6 is formed on an inner peripheral surface 4 of the hydraulic clamping tool 1.

The channel 3, which is located inside the hydraulic clamping tool 1 and is shown in FIGS. 1b and 1c, has a circumferential, essentially circular channel section 3a, which is formed radially between the inner peripheral surface 4 and an outer peripheral surface 5 of the hydraulic clamping tool 1. The channel 3 also has a plurality of further channel sections 7 which extend in the direction of the holding contour 6. In the present case, the holding contour 6 includes a plurality of expansion lugs 6a, which are intended to expand radially inwards as well as in both circumferential directions in order to clamp the workpiece. For this purpose, the further channel sections 7 are, on the one hand, approximately T-shaped and also extend over a large part of the axial length of the expansion lugs 6a. The expansion lugs 6a extend between the two end faces 1a, 1b and have a constant lug height H (see FIG. 1b).

According to FIGS. 2a and 2b, the hydraulic-expansion chuck 1 for clamping a workpiece 2, which in the present case is a gearwheel, has a channel 3 integrated therein which contains a hydraulic fluid (not shown here). The hydraulic fluid is intended to be pressurized in order to clamp the workpiece 2 in a workpiece receiving opening 16 (see FIG. 1a) in the hydraulic-expansion chuck 1. Like reference numerals as in FIGS. 1a to 1c denote like elements. In the present case, a hydraulic cylinder 8 is fluidly connected to the channel 3 and is intended to introduce a pressure on the hydraulic fluid. Furthermore, a venting cylinder 9 is fluidly connected to the channel 3 and provided to vent the channel 3. A flange component 13 for the axial positioning of the workpiece 2 in the hydraulic-expansion chuck 1 is arranged on one end face 1b and fixed by screw elements 14.

Like the hydraulic-expansion chuck 1 according to the first embodiment, the hydraulic-expansion chuck 1 according to the second embodiment is produced by an additive manufacturing process and is made from a martensitic tool steel in an essentially annularshape. On an inner peripheral surface 4 of the hydraulic clamping tool 1, a holding contour 6 is formed, which is shaped corresponding to the tooth geometry of the workpiece 2. The holding contour 6 according to the second exemplary embodiment essentially corresponds to the holding contour 6 according to the first exemplary embodiment.

The channel 3, which is located inside the hydraulic clamping tool 1 and is shown in FIGS. 2a and 2b, has a first and a second essentially circular circumferential channel section 3a, 3b. The two circumferential channel sections 3a, 3b are axially spaced from each other and are fluidically connected to each other via further channel sections 7. The further channel sections 7 are guided in the direction of the holding contour 6 on the inner peripheral surface 4. By screwing the hydraulic cylinder 8 into the bore 12 provided on the hydraulic-expansion chuck 1, the hydraulic fluid is forced out of the first circumferential channel section 3a into the further channel sections 7, expanding the holding contour 6 so that the workpiece 2 is held in a positive and non-positive manner.

The third embodiment of the hydraulic clamping tool 1 according to FIGS. 3a and 3b essentially corresponds to the second embodiment of the hydraulic clamping tool 1 according to FIGS. 2a and 2b. The third embodiment of the hydraulic clamping tool 1 differs from the second embodiment of the hydraulic clamping tool 1 only in that a large number of cylindrical shaped holding elements 10 are arranged partially movable at the holding contour 6 and are intended to be partially displaced against the workpiece 2 when clamping the workpiece 2. An annular washer 11 is arranged axially on one end face of the hydraulic expansion tool 1 for axial reception and partially movable mounting of the receiving elements 10 and secured by means of three screw elements 12.

REFERENCE NUMERALS

1 Hydraulic clamping tool
1a, 1b End face
2 Workpiece
3 Channel
3a, 3b Circumferential channel section
4 Inner peripheral surface
5 Outer peripheral surface
6 Holding contour
7 Further channel section
8 Hydraulic cylinders
9 Ventilation cylinder
10 Receiving element
11 Annular washer
12 Screw element
13 Flange component
14 Screw element
15 Axis of rotation
16 Workpiece receiving opening
H Lug height

The invention claimed is:

1. A hydraulic-expansion chuck for clamping a workpiece, comprising:
   an annular body;
   an inner circumferential surface;
   an outer circumferential surface;
   an axis of rotation;
   a channel integrated into the annular body for receiving a pressurized hydraulic fluid to clamp the workpiece, the channel comprising an annular peripheral channel section formed radially between the inner circumferential surface and the outer circumferential surface;
   a continuous undulating holding contour comprising a plurality of expansion lugs disposed on the inner circumferential surface; and
   a plurality of further channel sections branching off from the channel, wherein:
      at least one of the plurality of further channel sections extends into a respective lug of the plurality of expansion lugs; and
      the hydraulic-expansion chuck is manufactured by an additive manufacturing process.

2. The hydraulic-expansion chuck of claim 1, wherein the hydraulic-expansion chuck is made of spring steel.

3. The hydraulic-expansion chuck of claim 1, further comprising two end faces, wherein each respective expansion lug extends between the two end faces with a constant lug height.

4. The hydraulic-expansion chuck of claim 1, wherein each one of the plurality of further channel sections is T-shaped in an axial direction.

5. The hydraulic-expansion chuck of claim 1, wherein each one of the plurality of further channel sections is T-shaped as seen in a longitudinal direction of the annular peripheral channel section.

6. The hydraulic-expansion chuck of claim 1 further comprising a hydraulic cylinder, wherein:
the channel and the plurality of further channel sections are filled with a hydraulic fluid; and
the hydraulic cylinder is fluidly connected to the channel and arranged to pressurize the hydraulic fluid.

7. The hydraulic-expansion chuck of claim 1, further comprising a ventilation cylinder fluidly connected to the channel for venting the channel.

8. A method of operating the hydraulic-expansion chuck of claim 1 comprising:
clamping a gear with the hydraulic-expansion chuck; or
clamping a component with an external thread with the hydraulic-expansion chuck.

9. A hydraulic-expansion chuck for clamping a workpiece, comprising:
an annular body;
an inner circumferential surface;
an outer circumferential surface;
an axis of rotation;
a channel integrated into the annular body for receiving a pressurized hydraulic fluid to clamp the workpiece, the channel comprising an annular peripheral channel section formed radially between the inner circumferential surface and the outer circumferential surface;
a holding contour comprising a plurality of expansion lugs disposed on the inner circumferential surface; and
a plurality of further channel sections branching off from the channel, wherein:
at least one of the plurality of further channel sections extends proximate a respective lug of the plurality of expansion lugs;
the hydraulic-expansion chuck is manufactured by an additive manufacturing process; andT
a plurality of cylindrical shaped holding elements arranged at least partially movably on the holding contour and are displaceable against the workpiece when the workpiece is clamped.

* * * * *